April 14, 1959  CHING C. LOO  2,882,025
HOMOGENIZING VALVE

Filed June 16, 1955  2 Sheets-Sheet 1

CHING C. LOO
INVENTOR.

BY
ATTORNEY

April 14, 1959 CHING C. LOO 2,882,025
HOMOGENIZING VALVE
Filed June 16, 1955 2 Sheets-Sheet 2

CHING C. LOO
INVENTOR.

BY
ATTORNEY

United States Patent Office 2,882,025
Patented Apr. 14, 1959

2,882,025

HOMOGENIZING VALVE

Ching C. Loo, Sepulveda, Calif., assignor to Carnation Company, Los Angeles, Calif., a corporation of Delaware Application June 16, 1955, Serial No. 515,999

9 Claims. (Cl. 259—4)

The present invention relates to homogenizing or emulsifying devices and more specifically to a device of this type particularly adapted for the homogenization of milk so as to provide a product which is stable in that the size of the fat globules have been considerably reduced so as to be suspended in the milk.

Prior homogenizing valves are made to break up the size of the fat globules by a shearing or impingement action and the infringement or shearing surfaces and impingement arrangements in valves of this type necessarily create considerable resistance to the flow of milk therethrough. Therefore, it is commonly necessary to use a pressure of 2000 to 3000 p.s.i. to force the milk through a valve of this type in order to obtain efficient homogenization thereof. It has been discovered that milk can be effectively homogenized by cavitation, a phenomenon similar to the boiling of a liquid. When cavitation occurs, numerous microscopic vapor bubbles quickly form and collapse and in milk such cavitation bubbles are most likely to develop at the fat-serum interface. When a cavitation bubble collapses the surrounding liquid rushes in to fill the void at a velocity approaching the speed of sound and as a result of this high velocity the liquid becomes capable of smashing the fat globules. The homogenizing device of the present invention utilizes the principle of cavitation to effect homogenization of liquids such as milk, and broadly directs or causes the milk to pass over a sharp edge which causes an abrupt reduction in the pressure of milk. At a sufficiently high velocity the pressure urging the milk to flow past the sharp edge drops to the vapor pressure of milk and cavitation develops. It has been found that a device utilizing the principles of cavitation is capable of effectively homogenizing fresh milk when the pressure across the sharp edge is only 700 p.s.i. and the back pressure is only 75 to 150 p.s.i.

It is, therefore, a primary object of the present invention to provide a device of this type which is superior in operation and construction to presently known and used devices.

A further object of the present invention is to provide a device of this type which utilizes the principle of cavitation for effecting homogenization of milk.

Another object of the present invention is to provide a device of this type having means for directing a flow of milk past a sharp edge so as to cause an abrupt reduction in the pressure of milk and to cause the development in the milk of numerous microscopic vapor bubbles which rapidly form and collapse.

Still another object of the present invention is to provide a device of this type utilizing the principles of cavitation for effecting the homogenization of milk which is simple in construction, which can be easily and economically manufactured, and which can be quickly assembled or disassembled.

Other objects and advantages of the present invention will become apparent to those skilled in the art upon perusal of the following description and drawings in which.

Figure 1:
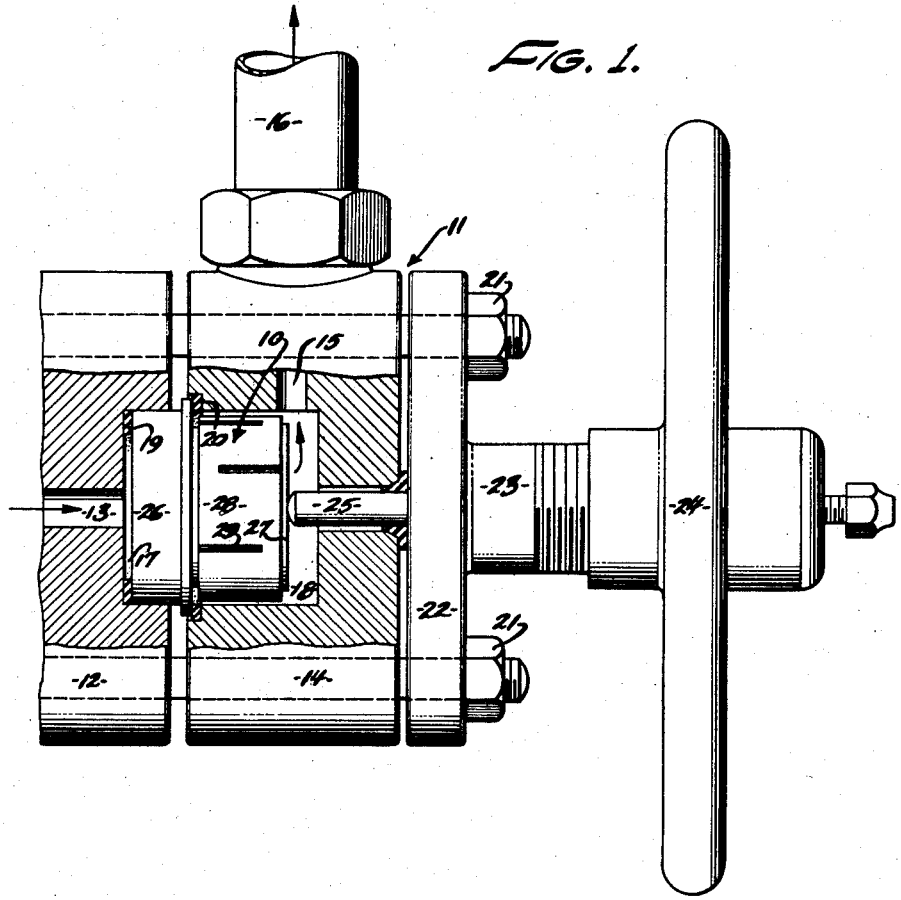
Fig. 1 is a side elevational view, with parts broken away, of an homogenizing valve embodying the principles of the present invention shown in combination with a mounting means.
Figure 2:
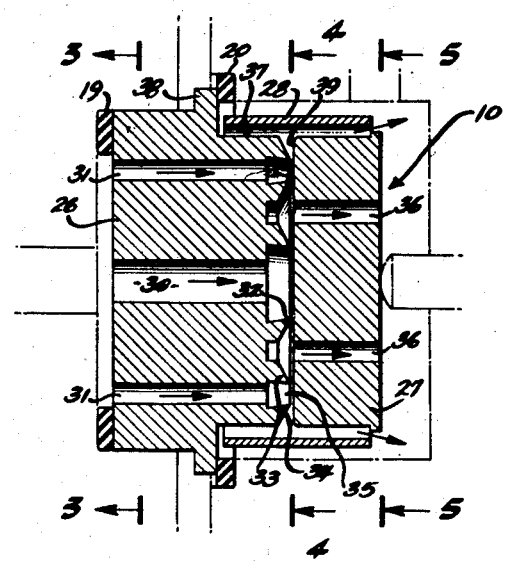
Fig. 2 is a vertical sectional view of the mounting means shown in Fig. 1, slightly enlarged.
Figure 3:
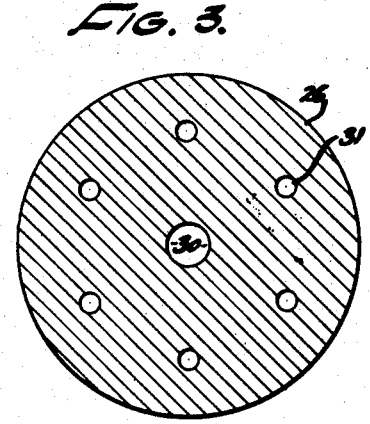
Fig. 3 is a cross-sectional view taken on the line 3—3 of Fig. 2.
Figure 4:
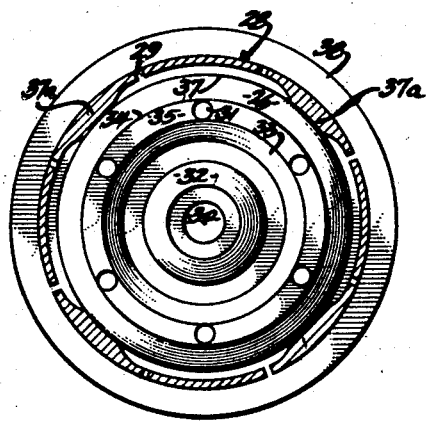
Fig. 4 is a cross-sectional view taken on the line 4—4 of Fig. 2.

Referring to Fig. 1 of the drawings, I have illustrated a homogenizing valve embodying the principles of the present invention and broadly designated by the numeral 10 in combination with a suitable mounting means broadly designated by the numeral 11. The mounting means 11 is capable of being of any suitable or well-known type and comprises in the present instance a stainless steel block unit 12 which has formed therein a milk port 13 through which milk under pressure is pumped into homogenizing valve 10 and a stainless steel block 14 which has an exit port 15 formed therein which directs homogenized milk from valve 10 into a suitable milk pipe 16. Each of the blocks 12 annd 14 has a recess 17 and 18 respectively formed therein which receives therein the valve 10, and suitable packings 19 and 20 are provided for well-known purposes. Suitable bolts 21 interconnected the blocks 12 and 14 and a plate 22 is carried by bolts 21 adjacent block 14. The plate 22 has a threaded hub portion 23 which threadedly receives a suitable hand wheel 24. The hand wheel 24 is adjustable axially on the threaded hub portion 23 and moves a valve rod 25 into adjusting relationship with respect to the homogenizing valve 10 as will be more fully appreciated hereinafter.

The homogenizing valve 10 is of three-piece construction, one piece being in the form of a valve seat element 26, the second piece being in the form of a valve plug element 27 and the third piece being in the form of a guide sleeve 28, the guide sleeve which is in the form of an expandable sleeve having cuts 29 formed therein being effective for keeping the valve seat 26 in perfect alignment with respect to the valve plug 27 which is necessary for effecting homogenization of milk passed through the valve.

As previously suggested valve 10 is so designed as to utilize the principles of cavitation in the homogenization of milk and to thereby reduce to a considerable extent the necessary pressure of the milk to effect complete homogenization thereof. This is effected by forming an axial inlet port 30 in valve seat 26 and a plurality of inlet ports 31 which encircle port 30 and which are parallel thereto. The inner face of valve seat 26 has formed thereon concentric circles of sharp edges or ridges 32, 33 and 34, each of these ridges in cross section being in the form of an acute angle or an angle less than 90 degrees. An annular groove 35 is formed between the ridges 33 and 34 and the ports 31 opening into annular groove 35 so that the ridges 33 and 34 face and encircle the ring of port 31 opening into groove 35. The ridge 32 faces and encircles the exit opening of axial port 30 so that the milk being caused to flow through ports 30 and 31 is caused to flow past one of the ridges 32, 33 or 34.

Valve plug 27 is in the form of a flat disc which has a ring of exit or outlet ports 36 formed therein. The outside diameter of valve plug 27 is substantially identical to the diameter of a portion 37 of valve seat 26 and the valve plug and valve seat are held in aligned face-to-face relationship by means of opposed resilient face sections 37a of guide sleeve 28, the exit ports 36 being located between ridges 32 and 33 so that milk being directed from inlet ports 30 and 31 to the outlets ports 36 will be caused to flow past ridge 32 or ridge 33.

In operation a flange 38 of valve seat 26 is located against packing 20 and the hand wheel 24 adjusted so that the valve rod 25 spaces the flat inner end surface 39 of valve plug 27 approximately 1/1000 of an inch from the periphery of ridges 32, 33 and 34. Milk is forced under a pressure of approximately 700 p.s.i. through ports 30 and 31. The milk flowing through port 30 is forced to flow past ridge 32 and the milk in ports 31 is forced to flow either past ridge 33 or past ridge 34. The ridges or sharp edges 32, 33 and 34 cause an abrupt reduction in the pressure of the milk which in turn causes numerous microscopic vapor bubbles to rapidly form and collapse. Since in milk these cavitation bubbles or vapor bubbles are most likely to develop at the fat-serum interface, when a bubble collapses and the surrounding liquid rushes in to fill the void at a velocity approaching the speed of sound, the fat globules are smashed to a degree sufficient to effect complete homogenization of the milk. After the milk has flowed past the ridges or sharp edges it flows either through exit ports 36 into recess 18 or between the valve plug, valve seat and the guide sleeve into recess 18 through the grooves or cuts 29. The homogenized milk is directed out of recess 18 through pipe 16 to either further processing or packaging machinery.

Since cavitation is known to develop in the boundary layer of a fluid milk, more boundary area per unit cross sectional area of flow results in better distribution of cavitation bubbles in the milk. It will be appreciated, therefore, that the arrangement of concentric rings of sharp edges or ridges permits the manufacture of a valve for homogenizing milk by cavitation to be built that is of convenient size while at the same time being of sufficient capacity to handle a large volume of milk. It will also be appreciated that the valve is extremely simple in construction, has no movable parts and is extremely easy to disassemble and clean after use.

Figure 6:
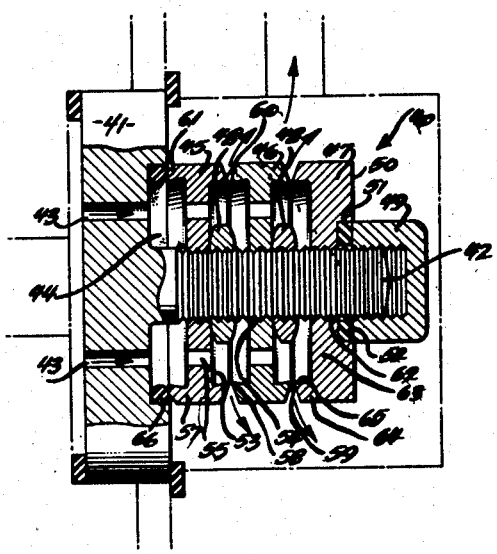
Fig. 6 is a side elevational view, with parts broken away to show details in construction of a modified form of homogenizing valve embodying the principles of the present invention.
Figure 5:
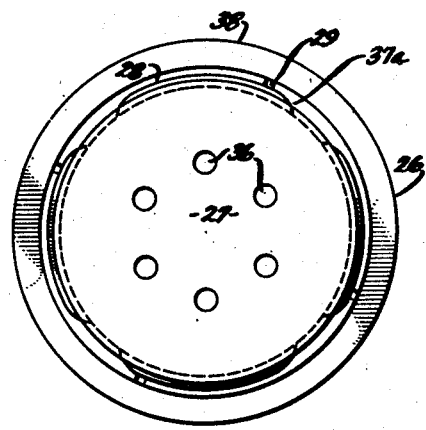
Fig. 5 is an end view looking in the direction of line 5—5 of Fig. 2.

A modified form of the homogenizing valves of the present invention is illustrated in Fig. 6. This modified valve broadly designated by the number 40 can be positioned in a mounting means similar to previously described mounting means 11 and preferably comprises a base 41 which has a centrally disposed axially extending threaded portion 42. A plurality of entry or inlet ports 43 are formed in the base 41 and preferably arranged in a circular pattern around the axis thereof and each of these ports empties into a recess 44. A plurality of homogenizing rings 45, 46 and 47 are threadedly received on the threaded portion 42 and locked in predetermined spaced relationship by means of jam nuts 48 and a cap nut 49. The end homogenizing ring 47 has a flat top section 50 with a recess 51 formed therein which receives a suitable fiber gasket 52.

Homogenizing rings 45 and 46 are substantially identical in construction and each comprises a web portion 53 in which is formed a threaded opening 54 and a plurality of ports 55. The periphery of each of the rings is in the form of a rim 57 which in ring 46 has formed on the opposite sides thereof inwardly facing sharpened ridges 58 and 59, these ridges in cross section being in the form of an acute angle and in ring 45 has formed thereon an inwardly facing ridge 60 and a sealing seat 61, ridge 60 likewise being in the form of an acute angle in cross section.

The homogenizing ring 47 has a similar threaded opening 62 formed therein, a web 63 and a peripheral rim 64 which has an inwardly facing ridge 65 similar to ridges 58, 59 and 60 of rings 45 and 46. In each of the homogenizing rings, the peripheral edge of its inwardly facing ridge or ridges is located in a plane substantially normal to the axis of the ring.

In operation the homogenizing ring 45 is positioned on the threaded portion 42 so as to place seat 61 in sealing relationship with respect to a sealing ring 66 located in recess 44. The homogenizing rings 46 and 47 are positioned on threaded portion 42 so as to locate ridge 58 substantially 1/1000 of an inch from ridge 60 and ridge 65 substantially 1/1000 of an inch from ridge 59. It will be appreciated, therefore, that as the milk is directed into recess 45 through entry ports 43 under a pressure of approximately 700 p.s.i. that the same will be directed into the space formed between the respective webs of rings 45 and 46. A portion of this milk will be forced out across the opposed ridges 58 and 60 while the remaining milk will be forced upwardly through ports 53 of ring 46 into the space formed between the webs of rings 46 and 47 and then out of the valve across the sharp ridges 59 and 65. The flow of milk past the sharp ridges 58, 59, 60 and 65 causes an abrupt reduction in the pressure of the milk which in turn causes the formation and collapse of numerous microscopic vapor bubbles. Since these vapor bubbles likewise form at the fat-serum interface, the liquid rushing in to fill the void after a bubble collapses smashes the fat globules to an extent sufficient to effect complete homogenization of the milk. It will also be appreciated that homogenization is likewise effected by a pressure equivalent to about 700 p.s.i. whereas prior homogenizing valves required the pressure of the milk to be between the range of 2000 to 3000 p.s.i. to effect complete homogenization thereof. It will be further appreciated that the device is extremely simple in construction, can be easily adjusted as far as the space between the opposed ridges is concerned and can be easily and quickly assembled or disassembled. Also, the arrangement of the sharp ridges or homogenizing rings of this type permit homogenization of a large volume of milk by a valve which is of convenient size, effecting thereby economy of construction.

Having thus described the invention, what is claimed is:

1. An homogenizing valve comprising a valve seat element and a valve plug element, means for joining said element in end-to-end substantially engaging relationshop, said joined elements having jointly a passageway therethrough comprising a plurality of inlet ports formed in said valve seat and a plurality of outlet ports formed in said valve plug, said inlet ports comprising a centrally disposed port and a plurality of ports encircling said centrally disposed port and said outlet ports being circularly arranged around the axis of said valve plug and being located between the plane of said encircling inlet ports and said centrally disposed inlet port, the end face of said valve seat having formed thereon a plurality of concentric ridges which encircle the ring of exit openings of said encircling inlet ports and the exit opening of said centrally disposed inlet port and terminate in close proximity to the end face of said valve plug, each of said ridges being substantially angular shaped in cross-section and facing substantially in the direction of its adjacent exit opening whereby fluid in passing through the valve is caused to flow over at least one ridge for effecting homogenization thereof by cavitation.

2. An homogenizing valve comprising a valve seat element and a valve plug element, an expandable guide sleeve for joining said element in end-to-end substantially engaging relationship, said joined elements having jointly a passageway therethrough comprising a plurality of inlet ports formed in said valve seat and a plurality of outlet ports formed in said valve plug, said inlet ports comprising a centrally disposed port and a plurality of ports encircling said centrally disposed port and said outlet ports being circularly arranged around the axis of said valve plug and being located between the plane of said encircling inlet ports and said centrally disposed inlet port, the end face of said valve seat element having formed thereon a plurality of concentric ridges which encircle the exit opening of said centrally disposed inlet port and the ring of exit openings of said encircling inlet ports and terminate in close proximity to the end face of said valve plug, each of said ridges being in the form of an acute angle in cross-section and facing substantially in the direction of its adjacent exit opening whereby fluid directed through the valve is caused to flow over said ridges for effecting homogenization thereof by cavitation.

3. An homogenizing valve comprising a pair of spaced elements having substantially opposed mating surfaces adapted to permit the flow of liquid therebetween from a point of entry to a point of exit, there being a flow passageway between said points, the surface of one of said elements having formed thereon a ridge substantially angular shaped in configuration located between said point of entry and said point of exit, there being no substantial restriction in said flow passageway until said fluid reaches said ridge, said ridge terminating in close proximity with respect to the surface of the other of said elements, the face of said ridge facing away from said point of entry forming an acute angle with respect to the surface of said one of said elements whereby numerous microscopic vapor bubbles are caused to rapidly form and collapse in said liquid upon said liquid passing over said ridge.

4. An homogenizing valve comprising a pair of fluid conduit elements joined in end to end relationship and having jointly a passageway therethrough comprising an inlet port formed in one of said elements and an outlet port formed in the other of said elements to permit the flow of fluid through said valve, the end face of each of said elements being positioned in close proximity with respect to each other and said end faces forming a flow passageway between the exit opening of said inlet port and the entry opening of said outlet port, the end face of one of said elements having formed thereon a ridge angularly shaped in cross-section located between said exit opening of said inlet port and said entry opening of said outlet port, there being no substantial restriction in said flow passageway until said fluid reaches said ridge, said ridge extending in the direction of the end face of the other of said elements and terminating in close proximity with respect thereto, the face of said ridge facing said exit opening forming an acute angle with respect to the end face of said one of said elements whereby fluid is directed across said ridge for effecting homogenization thereof by cavitation.

5. An homogenizing valve comprising a pair of fluid conduit elements joined in end to end relationship and having jointly a passageway therethrough comprising an inlet port formed in one of said elements and an outlet port formed in the other of said elements to permit the flow of fluid through said valve, the end face of each of said elements being positioned in close proximity with respect to each other and said end faces forming a flow passageway between the exit opening of said inlet port and the entry opening of said outlet port, the end face of one of said elements having formed thereon a ridge angular shaped in cross-section located between said exit opening of said inlet port and said entry opening of said outlet port, there being no substantial restriction in said flow passageway until said fluid reaches said ridge, said ridge encircling said exit opening of said inlet port and extending in the direction of the end face of the other of said elements and terminating in close proximity with respect thereto, the face of said ridge facing said exit opening forming an acute angle with respect to the end face of said one of said elements whereby fluid is directed across said ridge for effecting homogenization thereof by cavitation.

6. An homogenizing valve comprising a pair of detachably joined elements having mutually substantially engaging surfaces, one of said elements having formed therein a plurality of inlet ports and the other of said elements having formed therein a plurality of outlet ports, said substantially engaging surfaces defining a flow passageway between the exit opening of each of said inlet ports and the entry opening of its associated outlet port, one of said surfaces having concentric ridges formed thereon substantially angularly shaped in cross-section and located between associated exit openings of said inlet ports and entry openings of said outlet ports, said inlet ports and said outlet ports being so located relative to said ridges that fluid passing through said valve will be directed against and across one of said ridges, there being no substantial restriction in said flow passageway until said fluid reaches said one ridge, said ridges terminating in close proximity with respect to the other of said surfaces, and the face of each of said ridges facing away from its respective inlet port forming an acute angle with respect to said one of said surfaces.

7. An homogenizing valve comprising a valve seat element, a valve plug element, an expandable guide sleeve for joining said elements in end to end substantially engaging relationship and said joined elements having jointly a passageway therethrough comprising an inlet port formed in said valve seat, an outlet port formed in said valve plug, and a flow passageway defined by the substantially engaging end faces of said elements between the exit opening of said inlet port and the entry opening of said outlet port, said valve seat having formed on the end face thereof a ridge having an acute angled edge in cross-section extending in the direction of said valve plug and terminating in close proximity thereto, said ridge located between said inlet port and the entry opening of said outlet port, there being no substantial restriction in said flow passageway until fluid being processed through said valve reaches said ridge, and the face of said ridge facing the exit opening forming an acute angle with the end face of said valve seat.

8. An homogenizing valve comprising a pair of spaced rings having substantially opposed mating surfaces adapted to permit the flow of liquid from a point of entry located inside the periphery of said rings to a point of exit located outside the periphery of said rings, said surfaces definig a flow passageway between said points, each of said rings having a ridge formed adjacent the peripheral edge thereof, and each of said ridges being substantially angularly shaped in configuration and located between said point of entry and said point of exit, there being no substantial restriction in said flow passageway until said fluid reaches each of said ridges, said ridges terminating in close proximity to each other, the face of each of said ridges facing the axis of its respective ring forming an acute angle with respect to the mating surface of said ring whereby numerous microscopic vapor bubbles are caused to rapidly form and collapse in said liquid upon said liquid passing over said ridge.

9. An homogenizing valve comprising a base element including a threaded portion extending axially therefrom, a plurality of rings threadedly received on said threaded portion and locked in spaced relationship thereon, each of said rings having a web portion and a rim portion, the web portion of adjacent rings being in spaced apart substantially opposed relationship and the opposed rim surfaces of adjacent rings being in the form of ridges which are substantially angularly shaped in cross-section and positioned in close proximity to each other, the face of each of said opposed rim surfaces facing the axis of its respective ring forming an acute angle with its respective web portion, said base portion having inlet ports formed therein and said rings having inlet means for directing fluid from said inlet ports into the space formed between opposed webs of adjacent rings and said space forming a flow passageway for directing said fluid to the periphery of said adjacent rings, there being substantially no restriction in said flow passageway until said fluid reaches said ridges whereby said fluid is directed to flow across said ridges for effecting homogenization thereof.

References Cited in the file of this patent

UNITED STATES PATENTS

| | | |
|---|---|---|
| 1,533,843 | Ferns | Apr. 14, 1925 |
| 2,318,293 | Cornell | May 4, 1943 |
| 2,662,590 | Reich | Dec. 15, 1953 |

FOREIGN PATENTS

| | | |
|---|---|---|
| 18,059 | Great Britain | Aug. 5, 1909 |